MINE ROOF PINS AND APPARATUS FOR SETTING THE SAME

Original Filed Jan. 2, 1970 2 Sheets-Sheet 1

INVENTOR
GERALD W. ELDERS

Cohn and Powell
By
ATTORNEYS

MINE ROOF PINS AND APPARATUS FOR SETTING THE SAME

Original Filed Jan. 2, 1970 2 Sheets-Sheet 2

INVENTOR
GERALD W. ELDERS

Cohn and Powell
By ATTORNEYS

United States Patent Office

Re. 28,227
Reissued Nov. 5, 1974

28,227

MINE ROOF PINS AND APPARATUS FOR SETTING THE SAME

Gerald W. Elders, Aspen, Colo., assignor to Lee-Norse Company, Charleroi, Pa.

Original No. 3,643,542, dated Feb. 22, 1972, Ser. No. 110, Jan. 2, 1970, which is a continuation-in-part of application Ser. No. 846,795, Aug. 1, 1969. Application for reissue Apr. 18, 1973, Ser. No. 352,278
Int. Cl. F16b *15/00*
U.S. Cl. 85—10 R 9 Claims

Matter enclosed in heavy brackets [ ] appears in the original patent but forms no part of this reissue specification; matter printed in italics indicates the additions made by reissue.

ABSTRACT OF THE DISCLOSURE

A roof pin adapted to be pressed into a mine roof which includes an elongate shank having a head at one end and a pointed tip at the other end, a first portion of the shank being of greater peripheral dimension than a second portion to control the amount of surface pressure and skin friction when pressed into the mine roof, and thereby predetermine the force required for insertion. The relative longitudinally axial length of the first and second shank portions are preselected to provide such regulation. In one embodiment, the first shank portion is located ahead of the relatively reduced second shank portion in the direction of the pointed tip to provide a passage in the roof strata that is larger than the reduced second shank portion.

The method of installing a pin of this type in a mine roof comprises the steps of inserting the elongate pin by pressing into the mine roof, subjecting the mine roof to a compressive pressure in the area of the pin to force the strata tightly together so that the pin will hold the strata in such condition, and releasing the compressive pressure after the pin has been inserted so that the roof strata will provide substantially full length contact with the pin to lock the pin in place. In those pins in which the first shank portion is located ahead of the relatively reduced second shank portion in the direction of the pointed tip, the roof strata will fill in behind the first shank portion and assist in locking the pin in place when the compressive pressure is released after the pin has been inserted.

The pin-setting device for use in fixing pins of this type in a mine roof include positioning means that locate the pin at a predetermined area of the roof and subject the mine roof to the compressive pressure in the predetermined area to force the roof strata tightly together so that the pin will hold the strata in such condition, and which will selectively release the compressive pressure after the pin has been inserted so that the roof strata will provide substantially the full length contact with the pin to lock the pin in place.

CROSS REFERENCE TO RELATED APPLICATION

This application is a continuation-in-part of copending application Ser. No. 846,795, filed Aug. 1, 1969 and entitled "Apparatus for and Method of Setting Pins in Mine Roofs."

BACKGROUND OF THE INVENTION

This invention relates generally to improvements in roof bolting for mines, and more particularly to improved pins and apparatus for and method of setting pins in mine roofs.

In the heretofore conventional method of installing roof bolts in mine roofs, a hole approximately 1⅜ inches in diameter was drilled in the roof and was adapted to receive a ⅝ inch bolt and expansion shell. The expansion shell was located on the bolt and inserted into the drilled hole, the bolt being turned to expand the shell into gripping engagement with the hole wall. The hole was drilled to a depth until a a solid roof strata was reached and the expansion shell was anchored in this roof strata. It will be understood that the roof was hung from this bolt. There were essentially two separate operations in installing the bolt, namely, (1) drilling the hole, and (2) installing the bolt and shell in the hole and tightening the bolt under torque. The expansion shell represented the only bearing area holding the bolt in the roof.

In many instances, there are areas in a mine in which there is no sufficiently rigid roof strata in which to anchor an expansion shell. This type of installation was not successful in those areas. Moreover, in many instances, sufficient anchorage strength was not achieved because support was limited by the amount of bearing area presented by the expansion shell. The bolt does not contact the roof material. Tightening the bolt upon application of torque does not increase the holding power because it is limited by the type of material engaging the expansion shell.

The drilling of the hole in the mine roof has a tendency to relieve any compressive pressures inherent between the roof strata. Roof jacks are used only when the roof condition presents a hazard to the well-being of the miners and used to keep the rock from falling. At the present time, the greatest source of injury in a mine is caused by rock falling from the roof. In addition, a further health hazard is created by a drilling of such roof holes, in that the dust is particularly harmful to the lungs and eyes of miners.

In other fields of endeavor, pins have been driven into walls by hammers that apply a series of abrupt impact shock blows to the pins. This manner of driving pins is undesirable in mines because the impact tends to disturb the otherwise stable condition of the roof strata, not only in the immediate area in which the pin is driven, but for a considerable distance in all directions, and can adversely affect the holding power of previously driven pins.

The apparatus for and method of setting pins in mine roofs, disclosed in the copending U.S. application mentioned previously, eliminates the need for drilling any holes in the roof and eliminates any dust hazard that heretofore has been injurious to the miners, and avoids the relief of roof pressure. Moreover, the need for driving the pin by hammer blows is also eliminated, thereby avoiding the undesirable and potentially dangerous conditions that are caused by such impact shock. The pin is pressed into the mine roof with a substantially smooth force which avoids any chipping or removal or shock disturbance of roof material. The full length of the pin contacts the material of the mine roof for greater holding power and is not limited merely by the bearing surface provided by an expansion shell. Because the pin is pushed into the mine roof upon installation, there is no torque applied to the pin. It is not necessary to find a limestone roof strata in order to provide an effective installation of the pin when placed in position. The pin, when pushed into the mine roof creates a wedging formation of the material peripherally around and engaging the pin, whereby to enhance the holding power of the pin.

As each pin is pressed into the mine roof, a compressive pressure is exerted on the roof in the area in which the pin is located in order to force the roof strata tightly together and so that the pin will hold the strata in such a condition. Such compressive pressure can be applied to the roof before insertion of the pin and/or during insertion and/or after insertion by pressure applied to the pin.

The pin-setting device used in fixing the pins in the mine roof includes an elongate cylinder having an open-end and a closed-end, and a piston movably mounted in the cylinder. A positioning means locates the open end of the cylinder at the predetermined area of the roof, and means introduces fluid into the cylinder one side of the piston to move the piston and to press the pin located in the cylinder into the mine roof under a substantially smooth pushing force. The positioning means subjects the mine roof to the compressive pressure in the predetermined area to force the roof strata tightly together so that the pin will hold the strata in such condition. This compressive pressure can be applied by jacks extending between the mine roof and floor.

Under some circumstances, it has been found that roof pins having a constant shank diameter and over 20 inches in length required a great deal of compressive force to press the pin completely into the roof strata. The use of such large compressive forces are not practical in some mines depending upon the space available and the condition of the roof and floor.

SUMMARY OF THE INVENTION

The improved roof pins are especially designed to require less compressive force to press the pins completely into the roof strata. For example, instead of requiring a force of substantially seventy (70) tons to press a thirty inch roof pin into the mine roof, the pin is constructed so that only a force of substantially forty (40) tons is required and yet maintains standards that far exceed those set by the United States Bureau of Mines in prescribing what is acceptable as a good pull test. According to the standards set by the United States Bureau of Mines, a 6,000 pound pull is accepted as a good result on a roof bolt. With the present pin, method and apparatus for installing such pins, the pins have withstood at least 12,000 pounds of pull without any sign of disturbance.

The roof pin adapted to be pressed into the mine roof includes an elongate shank having a head at one end and a pointed tip at the other end, a first portion of the shank being of greater peripheral dimension than a second shank portion to control the amount of surface pressure and skin friction when pressed into the mine roof and thereby predetermine the force required for insertion. The relative longitudinally axial lengths of the first and second shank portions are selected to provide a controlled amount of surface pressure and skin friction on the pin to regulate the insertion force required.

In one embodiment, the first shank portion of the roof pin that is of greater peripheral dimension, is located ahead of the relatively reduced second shank portion in the direction of the pointed tip to provide a passage in the roof strata that is larger than the reduced second shank portion. The enlarged first shank portion can be a peripheral ring located near the pointed tip or a plurality of relatively small protuberances on the shank near the pointed tip [or a substantially helical rib located substantially at the pointed tip] or a substantially helical rib located substantially at the pointed tip.

The method of installing a pin of the type previously described in a mine roof comprises the steps of inserting the elongate pin by pressing it into the mine roof, subjecting the mine roof to a compressive pressure in the area of the pin to force the strata tightly together so that the pin will hold the strata in such condition, and releasing the compressive pressure after the pin has been inserted so that the roof strata will provide substantially full length contact with the pin to lock the pin in place. When using a pin in which a first shank portion is located ahead of the relatively reduced second shank portion, the first shank portion provides a passage in the roof strata that is larger than the reduced second shank portion. The roof strata will fill in behind the enlarged first shank portion and assist in locking the pin in place when the compressive pressure is released after the pin has been inserted.

DESCRIPTION OF THE PREFERRED EMBODIMENTS

Figure 1:
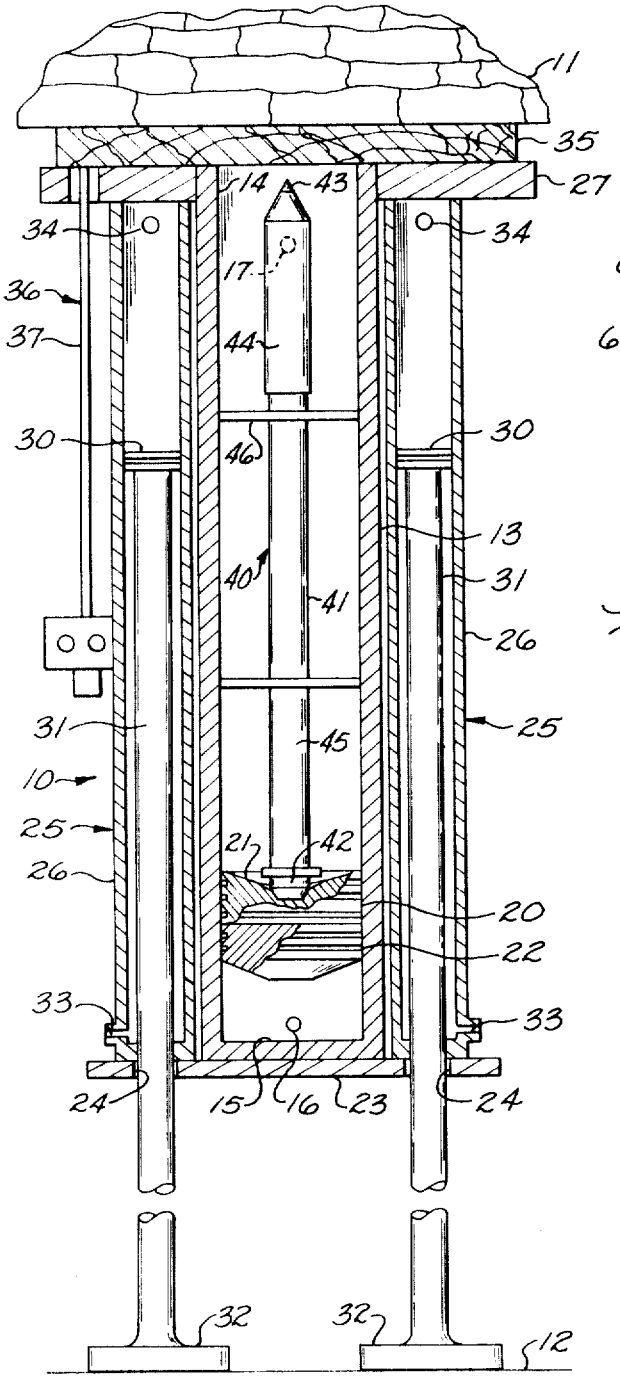
FIG. 1 is a side elevational view, partly in cross section, as taken in a vertical center plane passed through a pin-setting device and illustrating one pin embodiment.

Referring now by characters of reference to the drawings and first to FIG. 1, it will be understood that the pin-setting device generally indicated by 10 is located and extends between a mine roof 11 and the subjacent mine floor 12.

The pin-setting device 10 includes an elongate pin cylinder 13 having an open-end 14 and a closed-end 15. A cylinder port 16 communicates with the cylinder 13 near the closed bottom end 15 and communicates with a fluid means such as a hydraulic pump (not shown). An air port 17 is provided in the cylinder 13 adjacent the open-end 14 to provide for the free passage of air.

Located and slidably mounted in the cylinder 13 is a piston referred to by 20, the piston 20 consisting of two interconnected, yet separable upper and lower parts. Formed in the upper side of piston 20 is a downwardly tapered socket 21 that forms a pin seat. The concave configuration of the upper piston side assists in seating the pin head and in clearing dust from the cylinder wall. As is conventional, the piston 20 carries a plurality of piston rings 22 that provide an effective seal between the piston 20 and the wall of pin cylinder 13. The lower side of piston 20 is divergent upwardly so as to provide a clearance with the cylinder port 16, whereby fluid such as oil can pass therethrough even when the piston 20 is located in its lowermost location in the cylinder 13.

Attached to and carried by the lower closed end 15 of pin cylinder 13, is a mounting plate 23, the mounting plate 23 extending laterally outward from cylinder 13. Provided in the mounting plate 23 at opposite sides of the pin cylinder 13, are a pair of holes 24.

A positioning means is carried by the pin cylinder 13 for locating the open cylinder end 14 at a predetermined area of the mine roof 11. This positioning means includes a pair of hydraulic jacks referred to by 25 located at opposite sides of the pin cylinder 13. Each hydraulic jack [24] *25* includes an elongate cylinder 26 having its upper end engaging and closed by a pressure plate 27 that is fixed to the pin cylinder 13 at the upper open cylinder end 14. Reciprocatively mounted in each jack cylinder 26 is a piston 30 to which an elongate piston rod 31 is attached. The piston rod 31 extends through the closed bottom end of jack cylinder 26 and through the aligned hole 24 formed in the mounting plate 23. The piston rods 31 are provided with feet 32 that seat on the mine floor 12. Each jack cylinder 26 is provided with a hydraulic port 33 at its bottom end and a hydraulic port 34 at its upper end, the hydraulic ports 33 and 34 communicating with the jack cylinder 26 at opposite sides of the piston 30.

When used, the hydraulic jacks 25 are retracted and the pin-setting device is disposed in a substantially upright position with the jack feet 32 seating on the mine floor 12. A wood block 35 is disposed on top of the pressure plate 27 and overlapping the open cylinder end 14. Upon extension of the hydraulic jacks 26, the pressure plate 27 will urge the wood block 35 against the mine roof 11 and will clamp the block 35 in place at the predetermined area.

A safety means generally indicated by [37] *36* is carried by the pin cylinder 13, and is particularly mounted to one of the hydraulic jack cylinders 26. This safety means 36 includes a switch that is operatively connected to the hydraulic system so as to prevent operation of the hydraulic system unless the switch is actuated. The switch is actuated by an elongate plunger 37 that extends upwardly through the pressure plate 27 and into an engagement with the wood block 35. When the pin-setting device is located in its operable position, the plunger 37 is depressed a predetermined distance so as to actuate the switch of the safety means 36, and thereby conditions the hydraulic system for operation.

The pin referred to by 40 in FIG. 1 that is to be driven by the pin-setting device into the mine roof 11, includes an elongate shank 41 having a head 42 at one end and a pointed tip 43 at the other end. It will be understood that a first portion 44 of the shank 41 is of greater peripheral dimension than a second portion 45 to control the amount of surface pressure and skin friction when pressed into the mine roof, and thereby predetermine the force required for insertion. The relative longitudinally axial lengths of the first and second shank portions 44 and 45 respectively are selected to provide such force regulation. In the roof pin 40, the first shank portion 44, that is of greater peripheral dimension, is located ahead of the relatively reduced second shank portion 45 in the direction of the pointed tip 43 to provide a passage in the roof strata that is larger than the reduced second shank portion 45.

Mounted on and carried by the elongate pin shank 40 are one or more discs 46. These discs 46 are press-fitted on the pin shank 41 so that they will maintain their original axial displacement as the pin 40 is handled prior to being pressed into the mine roof 11. However, this connection between the discs 46 and the pin shank 41 will enable the discs 46 to slide longitudinally along the pin shank 41 as each disc engages the block 35, constituting an abutment, as the pin 40 is pressed into place. When the pin 40 is fully installed, the discs 46 will be clamped between the pin head 42 and the wood block 35 to provide a substantially solid bearing plate. The discs 46 retained the pin 40 in its centered position within the pin cylinder 13 and guide the pin 40 in its movement along the cylinder 13.

Figure 4:
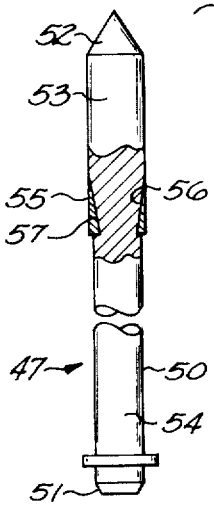
FIG. 4 is a fragmentary, side elevational view, partly in cross section, of another pin embodiment.
Figure 5:
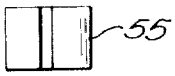
FIG. 5 is a side elevational view of a split collar utilized in the pin embodiment of FIG. 4.
Figure 6:
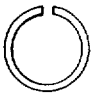
FIG. 6 is a top plan view of the split collar of FIG. 5.

Another pin embodiment is disclosed in FIG. 4. In this embodiment, the pin 47 includes an elongate shank 50 having a head 51 at one end and a pointed tip 52 at the other end. Similar to the construction of pin 40 in FIG. 1, the pin 47 in FIG. 4 has as its first shank portion 53 ahead of the relatively reduced second shank portion 54 in the direction of the pointed tip 52. Fitted on and retained by the elongate shank 50 is a split collar 55, the collar 55 having an internal, upwardly divergent camming surface 56 that engages a compatible and coacting camming surface 57 formed on the first shank portion 53. As is preferred, the peripheral dimension of the collar 55 is substantially the same as that of the first shank portion 53 so as to provide a substantially flush outermost surface. When the pin 47 is pressed into the mine roof, the first shank portion 53 including the collar 55 will provide a passage in the roof strata that is larger than the second shank portion 54. When fully inserted, and a pull is inserted on the pin 47, the surface pressure exerted on the split collar 55 will cause the collar to ride up on the camming surface 57, thereby causing an expansion of the collar 55 to increase the holding power of the pin 47.

Figure 2:
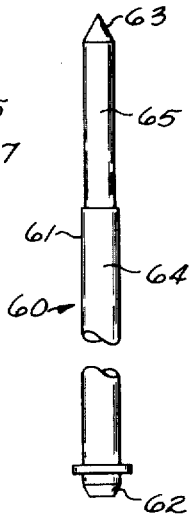
FIG. 2 is a fragmentary, side elevational view of another pin embodiment.

Another pin embodiment is shown in FIG. 2. In this embodiment, the pin 60 includes an elongate shank 61 having a head 62 at one end and a pointed tip 63 at the opposite end. The shank 61 has a first shank portion 64, that is of greater peripheral dimension, located behind the relatively reduced second shank portion 65 in the direction of the pointed tip 63.

Figure 3:
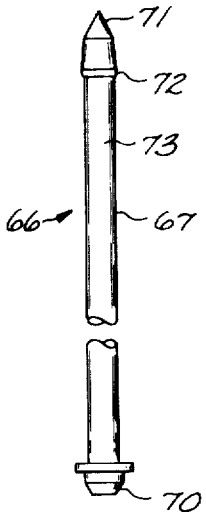
FIG. 3 is a fragmentary, side elevational view of another pin embodiment.

Another pin embodiment is disclosed in FIG. 3. In this embodiment, the pin 66 includes an elongate shank 67 having a head 70 and a pointed tip 71 at the other end. The enlarged shank portion 72 is a peripheral ring located near the pointed tip and having the greater peripheral dimension than the relatively reduced second shank portion 73 located behind the ring, the ring being slightly tapered.

Figure 7:
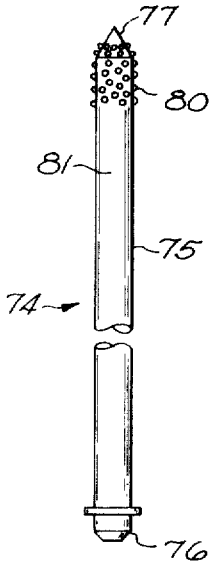
FIG. 7 is a fragmentary, side elevational view of another pin embodiment.

Another roof pin embodiment is disclosed in FIG. 7. In this embodiment, the roof pin 74 includes a shank 75 having a head 76 at one end and a pointed tip 77 at the other end. The first shank portion 80 includes a plurality of relatively small protuberances 80 located on the shank 75 near the pointed tip 77. These protuberances 80 are preferably located on the pointed tip 77 but clear of the terminal tip end. The relatively reduced second shank portion 81 is located behind the first shank portion 80. The protuberances are located in a random or predetermined pattern around the circumference of the shank 75 and will provide a passage in the roof's strata that is larger than the second shank portion 81 when the pin 74 is pressed into the mine roof 11.

Figure 9:
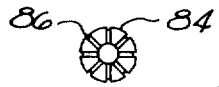
FIG. 9 is a top plan view of the pin shown in FIG. 7.
Figure 8:
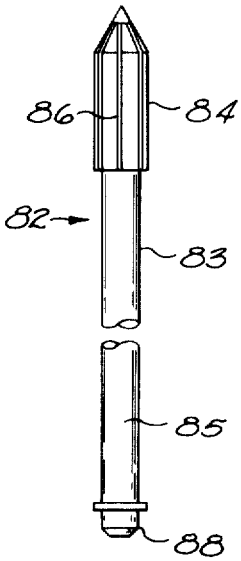
FIG. 8 is a fragmentary, side elevational view of another pin embodiment.

Another pin embodiment is disclosed in FIGS. 8 and 9. In this embodiment, the pin 82 is similar in construction to pin 40 previously described in that the pin 82 includes an elongate shank 83 having a first shank portion 84 that is of greater peripheral dimension than a second shank portion 85, the enlarged first shank portion being located ahead of the second shank portion 85. The first shank portion 84 is provided with a plurality of longitudinal, peripherally spaced grooves 86 that are open at both ends of the first shank portion 84 for the passage of roof material and to further control the amount of surface pressure and skin friction. These grooves 86 are substantially straight and parallel to the longitudinal axis of the shank 83. The first shank portion includes a part of the pointed tip 87. The grooves 86 extend on the pointed tip 87 but terminate short of the outermost tip end. A head 88 is provided on the opposite shank end.

Figure 10:
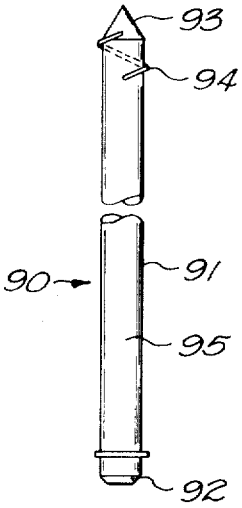
FIG. 10 is a fragmentary, side elevational view of another pin embodiment.

Another pin embodiment is disclosed in FIG. 10. In this embodiment, the roof pin 90 includes an elongate shank 91 having a head 92 at one end and a pointed tip 93 at the other end. The first shank portion 94 is a substantially helical rib located substantially at the pointed tip 93. The helical rib can be of substantially one turn on the pin shank 91 or it can be of more than one turn. The first shank portion 94 provided by the rib has a greater peripheral dimension that the relatively reduced shank portion 95 and is located ahead of the second shank portion 95 so as to provide a passage in the roof strata that is larger than the peripheral dimension of the second shank portion 95. To provide a lead in for the relatively enlarged first shank portion 94, the helical rib extends at least partially on the pointed tip 93.

The method of installing a pin of the type previously described into a mine roof comprises the steps of inserting the elongate pin by pressing into the mine roof, subjecting the mine roof to a compressive pressure in the area of the pin to force the strata tightly together so that the pin will hold the strata in such condition, and releasing the compressive pressure after the pin has been inserted so that the roof strata will provide substantially full length contact with the pin shank to lock the pin in place. With those pins in which the first shank portion of greater peripheral dimension than the second shank portion is located ahead of the relatively reduced second shank portion, the action of pressing the pin into the mine roof provides a passage in the roof strata that is larger than the reduced shank portion. When the compressive pressure on the mine roof is released after the pin has been inserted, the roof strata will fill in behind the first shank portion and assist in locking the pin in place.

The pin-setting device adapted for use in fixing the pins in the mine roof includes means for pressing the pin into the mine roof, and positioning means that locates the pin at a predetermined area of the roof and subjects the mine roof to a compressive pressure in the predetermined area to force the roof strata tightly together so that the pin will hold the strata in such condition. The positioning means selectively releases the compressive pressure after the pin has been inserted so that the roof strata will provide substantially full length contact with the pin to lock the pin in place.

It is thought that the operation of the pin-setting device 10 has become fully apparent from the foregoing detailed description of parts, but for completeness of disclosure, the method of usage will be briefly described.

First, it will be assumed that the jacks 25 are fully retracted, and that the pin piston 20 is dropped to its lowermost position. The pin, for example pin 40 in FIG. 1, is then placed into the cylinder 13 through the open end 14 so that the pin head 42 seats in the piston socket 21. The pin discs 46 will engage the cylindrical wall and guide pin 40 to its appropriate centered position. When the pin 40 is placed in the cylinder 13 and seated on the piston 20, the pointed tip 43 will be located within the open cylinder end 14. Then, the wood block 35 is placed on top of the pressure plate 27, overlapping the open cylinder end 14. The pin-setting device 10 is located in its substantially vertical position, with the jack feet 32 seating on the mine floor 12, and the jacks 25 are extended to clamp the block 35 against the mine roof 11 at the predetermined area at which the pin 40 is to be fixed.

A compressive pressure is applied to the mine roof 11 by the actuation of the jacks 25, the compressive pressure being applied through the pressure plate 27 and the wood block 35. This compressive pressure in the area at which the pin is to be fixed, forces the roof strata tightly together and preconditions the roof for the reception of the pin 40. While this compressive pressure is being applied to the mine roof 11, the pin 40 is pressed into the mine roof 11 by a substantially smooth pushing force applied to the pin head 42 through the piston 20. As the pin 40 is pushed, preferably with a smooth pushing force, the pin 40 will first pierce the block 35 and then move into the mine roof 11. As the pin 40 penetrates the roof strata, there is a full bearing contact of the roof material with the first shank portion 44. Upon continued penetration, the first shank portion 44 will provide a passage in the roof strata that is slightly larger than the relatively reduced shank portion 45. Predetermining the bearing contact area of the shank portion 45 and skin friction, and thereby determine the amount of force required to complete the insertion. Moreover, the inward movement of the pin 40 will cause the loose strata to deform slightly in the direction of the penetration in the immediate area contacting the roof pin 40, thereby creating a wedge formation that further increases the holding power of the pin 40.

As the pin 40 is pushed into the mine roof 11, the discs 46 will guide the movement of pin 40 axially along the pin cylinder 13. The uppermost disc 46 will first engage the underside of the block 35 at the open cylinder end 14, and will then slide relatively longitudinally along the pin shank 41. The next disc 46 will then engage the first disc 46 when it reaches the open cylinder end 14 and will effectively abut the block 35, and then such disc 46 will move slidably, longitudinally along the pin shank 41 in a direction toward the pin head 42. When fully pressed into place, the discs 46 are clamped between the pin head 42 and the block 35.

It is desirable to place a further compressive pressure on the roof strata of the mine roof 11 by pushing the pin head 42 with the pin piston 20, this compressive pressure being applied to the disc 46 constituting the bearing plate, and the block 40. This additional compressive pressure further conditions the roof strata by forcing the strata even more tightly together. The pin 40 will then hold the roof strata in such condition.

After the pin 40 has been installed, the pin piston 20 is retracted by relieving the hydraulic pressure. Then, the jacks 25 are retracted. The release of the compressive pressure causes a very slight relaxation of the roof strata that permits the strata to fill in behind the first shank portion 44 of the pin 40 and thereby provide substantially full length contact with the pin to lock the pin securely in place.

With those pins 40, 47, 66, 74, 82 and 90 in which the relatively enlarged first shank portion is located ahead of the remaining second shank portion, it is at times desirable to reduce the peripheral dimension of the second shank portion to such an extent that the roof material does not effectively contact the second shank portion after the pin is completely pressed into place so as to enhance the pulling force requirements. Under these circumstances, the length of the enlarged first shank portion will determine both the amount of force required for insertion and also the pulling force requirement. It will be understood that if it is determined that say a ten (10) inch length of enlarged first shank portion will far exceed the pull force standards of the Bureau of Mines and permit insertion under reasonable pushing force, the relatively reduced second shank portion, and hence the overall pin, can be of any desired length.

I claim as my invention:

1. A roof pin adapted to be pressed into a mine roof, comprising:

(a) elongate shank means having a head at one end and a pointed tip at the other end, a first portion of the shank means being of greater peripheral dimension than a second portion to provide a contact surface engageable with the roof material when the pin is pressed into the mine roof, the area of the contact surface being preselected to control the amount of surface pressure and skin friction and thereby predetermine the force required for insertion.

(b) the first shank portion, that is of greater peripheral dimension and provides the preselected contact surface area, is located ahead of the relatively reduced second shank portion in the direction of the pointed tip to provide a passage in the roof strata that is larger than the reduced shank portion.

2. A roof pin as defined in claim 1 in which:

(c) the area of the contact surface has a longitudinally axial length preselected to provide the controlled amount of surface pressure and skin friction on the pin to regulate the insertion force required.

3. A roof pin as defined in claim 2, in which:

(d) the first shank portion is substantially cylindrical and of greater diameter than the second shank portion and is located ahead of the second shank portion in the direction of the pointed tip to provide a passage in the roof strata that is larger than the second shank portion, the preselected area of the contact surface being provided by the cylindrical peripheral surface of the first shank portion.

4. A roof pin as defined in claim 2, in which:

(d) the first shank portion is a peripheral ring located near the pointed tip, the preselected area of the contact surface being provided by the peripheral ring and the tapered periphery between the tip and the ring.

5. A roof pin as defined in claim 2, in which:

(d) the first shank portion includes a plurality of relatively small protuberances on the shank means near the pointed tip, the preselected area of the contact surface being provided by the protuberances.

6. A roof pin as defined in claim 2, in which:

(d) the first shank portion includes a plurality of longitudinal, peripherally spaced grooves that are open at both ends of the first shank portion for the passage of roof material and to further control the amount of surface pressure and skin friction, the pressure area of the contact surface being provided by the periphery between the spaced grooves.

7. A roof pin as defined in claim 2, in which:

(d) the first shank portion is of greater diameter than the second shank portion and is located ahead of the second shank portion and at the pointed tip, and the first shank portion is provided with a plurality of longitudinal, peripherally spaced grooves that are open at both ends of the first shank portion for the passage of roof material and to further control the amount of surface pressure and skin friction, the preselected area of the contact surface being provided by the periphery between the grooves.

8. A roof pin as defined in claim 2, in which:

(d) the first shank portion is a substantially helical rib located substantially at the pointed tip, the preselected area of the contact surface being provided by the rib.

*9. A roof pin adapted to be pressed into a roof, comprising:*

*(a) elongate shank means having an end adapted to enter the roof, a first portion of the shank means being of greater peripheral dimension than a second portion to provide a contact surface engageable with the roof material when the pin is pressed into the roof, the area of the contact surface being preselected to control the amount of surface pressure and skin friction and thereby predetermine the force required for insertion,*

*(b) the first shank portion, that is of greater peripheral dimension and provides the preselected contact surface, is located ahead of the relatively reduced second shank portion in the direction of said end adapted to enter the roof to provide a passage in the roof strata that is larger than the reduced shank portion.*

References Cited

The following references, cited by the Examiner, are of record in the patented file of this patent or the original patent.

UNITED STATES PATENTS

| | | | |
|---|---|---|---|
| 1,200,594 | 10/1916 | Curtis | 85—21 |
| 1,332,059 | 2/1920 | Norwood | 85—21 |
| 1,360,344 | 11/1920 | Wood et al. | 85—30 X |
| 1,972,119 | 9/1934 | Wernhardt | 85—21 |
| 2,207,897 | 7/1940 | Schaus | 85—10 X |
| 2,203,294 | 6/1940 | Engle | 85—10 |
| 2,095,153 | 10/1937 | Rosenberg | 85—20 |
| 2,356,376 | 8/1944 | Brown | 85—19 |
| 2,504,311 | 4/1950 | Dunn | 85—10 E UX |
| 2,724,116 | 11/1955 | Termet | 85—10 E UX |
| 3,041,616 | 7/1962 | Henning et al. | 85—10 E UX |
| 3,091,991 | 6/1963 | Baker | 85—44 X |

FOREIGN PATENTS

| | | | |
|---|---|---|---|
| 782,804 | 4/1968 | Canada | 85—10 E |

DENNIS L. TAYLOR, Primary Examiner

U.S. Cl. X.R.

61—45 B; 85—30